United States Patent Office 2,826,049
Patented Mar. 11, 1958

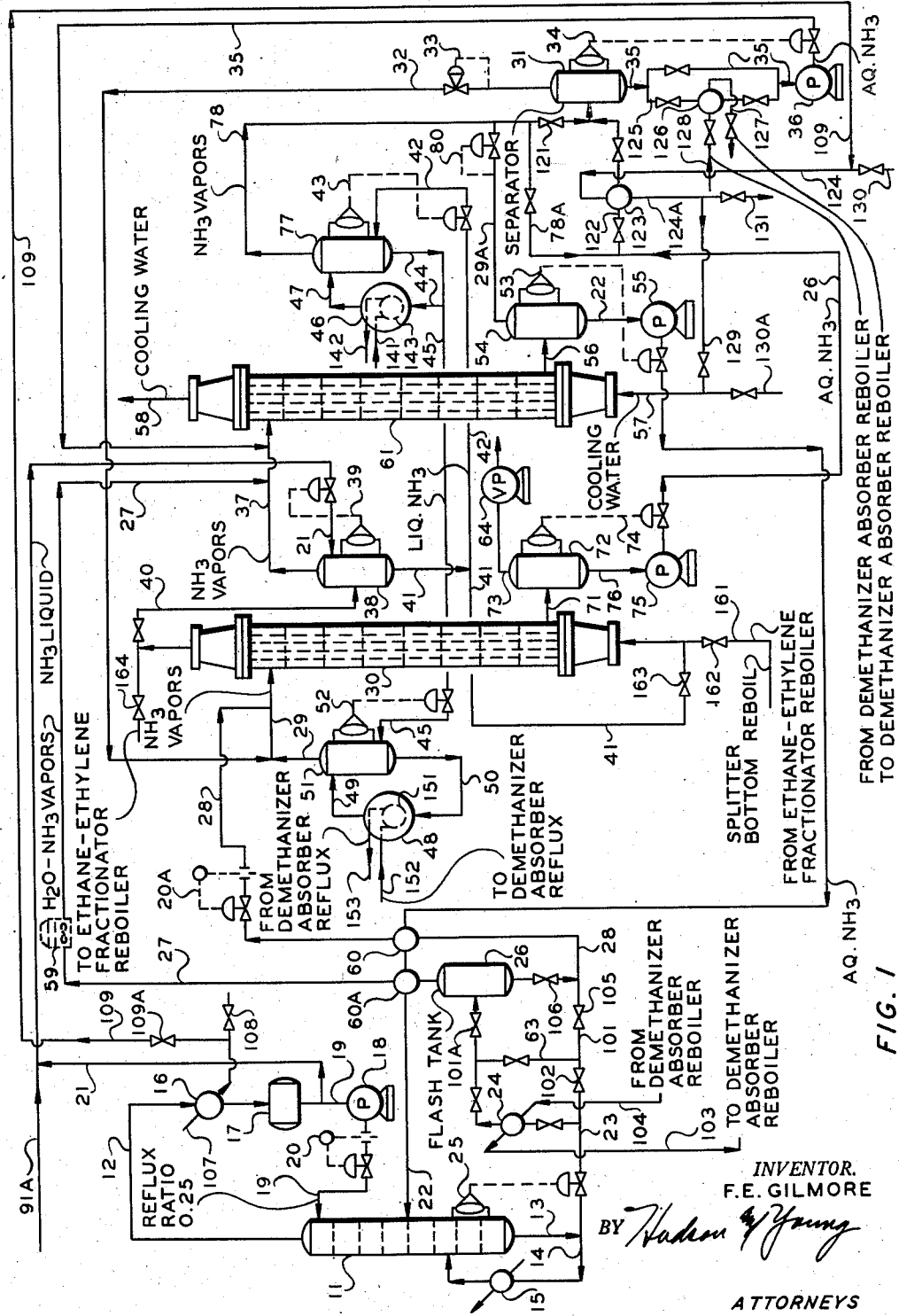

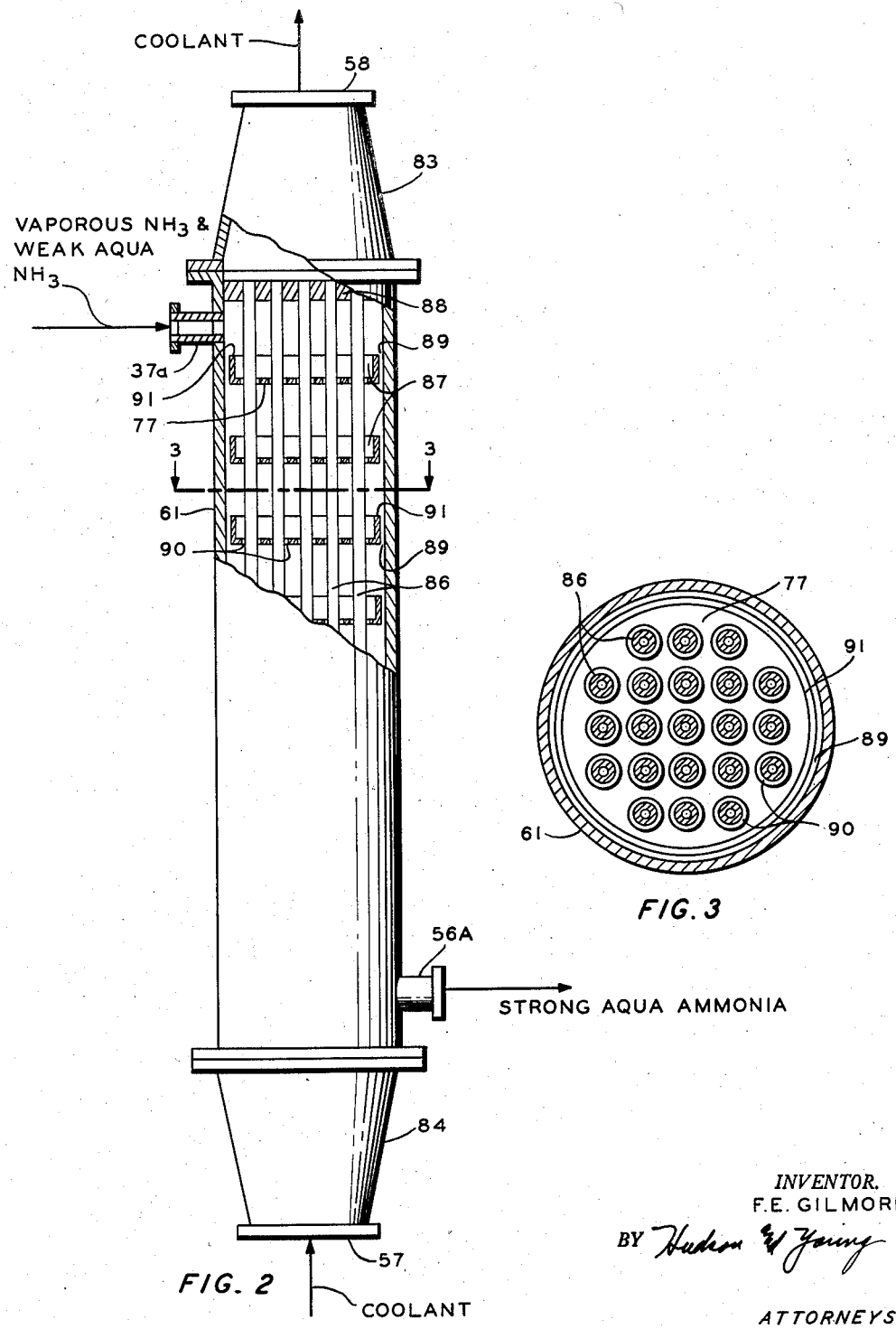

2,826,049

IMPROVED LOW TEMPERATURE ABSORPTION REFRIGERATION

Forrest E. Gilmore, Bartlesville, Okla., assignor to Phillips Petroleum Company, a corporation of Delaware Application October 13, 1955, Serial No. 540,189

14 Claims. (Cl. 62—179)

This invention relates to an improved refrigeration system using ammonia as the refrigerant. In one aspect it relates to a low temperature ammonia absorption refrigeration system. In another aspect, it relates to such a system in which the utility requirements are held to plant cooling water as the only extraneous cooling and to the use of waste heat as the only source of heat.

An object of my invention is to provide an efficient ammonia absorption refrigeration system.

Another object of my invention is to provide an absorption refrigeration system in which the utility requirements are limited to plant cooling water and ordinary exhaust or waste heat.

Still another object of my invention is to provide an efficient absorbing heat exchanger for use in such an absorption refrigeration system.

Yet another object of my invention is to provide apparatus and a method for cooling of the aqua ammonia during the absorption steps in place of after the absorption steps.

Still another object of my invention is to provide such a refrigeration system in which ammonia compression costs are low.

Still other objects and advantages will be realized upon reading the following description which, taken with the attached drawing, forms a part of this specification.

My invention involves the use of a low pressure, low temperature regenerative distillation step for which ordinary plant exhaust steam, sometimes called waste heat, provides the heat. By waste heat or exhaust steam, I mean such steam as that usually exhausted by steam powered equipment such as pumps and the like. Such steam frequently is exhausted from the pumps at about 15 pounds per square inch gauge pressure and it is such steam which I use for heating in my process. Ordinary plant cooling water provides all of the extraneous cooling for condensing of the recovered or regenerated ammonia. In order to utilize ordinary waste heat or exhaust steam, I supplement the regenerative fractional distillation step with a separate flashing operation in which a vapor is flashed from the regular distillation column aqua ammonia bottoms thereby effecting a further separation of ammonia from the aqua ammonia. Low temperature heat exchange used in my system is obtained by vaporization of ammonia within the process.

Specifically my invention comprises a method for providing refrigeration which includes flashing liquid ammonia in successively lower pressure flashing steps to cool the unvaporized ammonia to desired refrigeration temperatures, absorbing the flashed ammonia in aqueous ammonia of progressively increased concentrations of ammonia in progressively higher pressure absorption steps, passing the finally produced aqueous ammonia into a fractionation column and therein fractionating said aqueous ammonia under superatmospheric pressure to produce an overhead vaporous ammonia product and a bottoms product of aqueous ammonia of reduced ammonia content, condensing the overhead vaporous ammonia to produce liquid ammonia, reducing the pressure on the aqueous ammonia bottoms product in a bottoms flashing operation, removing flash vapors of aqueous ammonia from this bottoms flashing operation and passing same into the absorption step of highest pressure of the successive absorption steps, passing the flash bottoms of said bottoms flashing operation into the absorption step of lowest pressure of the successive absorption steps, cooling the aqueous ammonia and vaporous ammonia of the highest pressure absorption step by indirect heat exchange with plant cooling water and cooling the aqueous ammonia and vaporous ammonia of the lowest pressure absorption step by indirect heat exchange with the condensed liquid ammonia.

In the drawing, Figure 1 represents, in diagrammatic form, a flow diagram illustrative of the operation of my process.

Figure 2 is an elevational view, partially in section, of a portion of the apparatus of Figure 1.

Figure 3 is a sectional view taken on the line 3—3 of Figure 2.

Referring now to the drawing and specifically to Figure 1, reference numeral 11 identifies a more or less conventional fractional distillation column. This column is provided with vapor-liquid contacting apparatus such as bubble cap trays or any other suitable conventional vapor-liquid contacting apparatus. Reference numeral 12 identifies an overhead conduit which leads from the upper portion of the column to a condenser 16 and thence to a tank 17. A pump 18 is provided for transfer of a portion of liquid from tank 17 by way of a pipe 19 into the top of column 11. The rate of flow of liquid through pipe 19 is controlled by a rate of flow controller assembly 20.

A bottoms product removal pipe 13 is provided for column 11, and this pipe is connected to a pipe 14 for passage of a portion of the bottoms product through a heat exchanger 15 and thence into the reboiler section of column 11. A pipe 23 is also connected with pipe 13 for transfer of the remainder of the bottoms product to a flash vessel 26. In case heat is required to be added to the liquid flowing through pipe 23, a heat exchanger 24 is provided. In case it is not desired to add heat to the material flowing through pipe 23, a bypass pipe 63 is provided for by-passing the exchanger 24.

A pipe 27 connects the top of a flash tank 26 with a pipe 37 which in turn connects an ammonia flash vessel 38 with an absorbing heat exchanger 61. A pipe 56 connects this heat exchanger with an accumulator or separator vessel 54. A conduit 22 leads from the separator vessel 54 by way of a pump 55 through a heat exchanger 60 and thence to the fractional distillation vessel 11. A conduit 28 provided with a rate of flow controller 20A, leads from the bottom of the flash separator 26 through heat exchanger 60 into an ammonia vapor inlet pipe 29 on the inlet side of a second absorbing heat exchanger 30. A pipe 71 leads from the other end of the heat exchanger-absorber 30 to a separator tank 72 from which a conduit 76 leads by way of a pump 75 and line 26 to a conduit 78 which is intended to transfer ammonia vapors from a vaporizer tank 77 to a separator tank 31. A conduit 35 leads from the bottom of the separator tank 31 by way of a pump 36 to the aforementioned pipe 37. Conduit 41 leads cooled liquid ammonia from evaporator tank 38 to one end of the heat exchanger-absorber 30 and a conduit 40 leads from the other end of this heat exchanger-absorber to the evaporator 38.

A pipe 42 leads from conduit 41 into the surge tank 77 and the level of liquid ammonia in tank 77 is regulated by a liquid level flow controller assembly 43. Attached to the surge tank 77 is an evaporator vessel 46, a pipe 44 serving to transfer liquid from surge tank 77 to the evaporator 46 and a pipe 47 serving to lead vaporous ammonia to the surge tank 77. A surge tank 51 is an accumulator for liquid ammonia from which the liquid passes by way of a pipe 50 to an evaporator 48 and vapors return therefrom by way of a pipe 49 to the surge tank 51. A liquid level float controller assembly 52 regulates the flow of liquid ammonia through a pipe 45 from pipe 44 into surge tank 51. Liquid level float controllers 34, 53 and 74 regulate the level of liquids in separator tanks 31, 54 and 72 respectively. Pipes 32, 29A and 73 transfer vapors, mostly inerts, from separators 31, 54 and 72, respectively, to subsequent operational points of the system.

Ammonia for starting up the system and makeup ammonia, as required, are introduced into the system from a source, not shown, via line 91A.

A pipe 21 leads from conduit 19 to transfer a portion of liquid ammonia from tank 17 to the upper portion of separator vessel 38. A liquid level float controller assembly 39 operates to regulate the flow of liquid through pipe 21 into vessel 38 in response to the level of the liquid in this vessel. A liquid level float controller assembly 25 controls the withdrawal of bottoms product from the fractionator 11 to maintain a constant level therein. Back pressure regulators 33 and 80 regulate the pressure in separator vessels 31 and 54 respectively. Pipes 57 and 58 lead plant cooling water to and from, respectively, the absorbing heat exchanger 61. Reference numeral 59 identifies an air-fin atmospheric cooler disposed in pipe 27.

In the operation of my absorption refrigeration system, I will describe same beginning with the operation of the fractionator 11. Rich aqua ammonia is introduced as feed into this fractionator through pipe 22 and this fractionator operates in such a manner as to produce substantially anhydrous ammonia as an overhead product and a lean aqua ammonia as a bottom product, and using only waste steam at about 15 pounds per square inch gauge pressure for reboiling purposes. Steam at this pressure imparts a temperature of about 240° F. to the kettle contents of the column. The column is maintained at about 155 pounds absolute pressure and under these conditions the bottoms aqua ammonia product contains about 25 weight percent ammonia. The ammonia overhead vapors pass from the column through pipe 12, condenser 16 and condensate ammonia passes to the accumulator tank 17. This ammonia stream contains about 99½ percent NH$_3$. Such a portion of this ammonia as is required for refluxing the column in order to produce substantially anhydrous ammonia, about 0.25 reflux ratio in this specific example, is passed by pump 18 through pipe 19 to the upper portion of the column. Plant cooling water at about 90° F. is used for the indirect heat exchange in condenser 16. The liquid ammonia in tank 17 which is not required for refluxing is the refrigerant ammonia which is passed to the main portion of the refrigeration portion of my system.

In order to produce low temperature refrigeration for low temperature process work, the liquid ammonia not required for column refluxing, as just mentioned, is passed through pipe 21 into separator vessel 38. On passing through the valve in line 21, which is an element of the liquid level float controller assembly 39, the pressure of the liquid ammonia is reduced from about 153 p. s. i. a. to about 49 p. s. i. a. On experiencing this reduction in pressure the temperature of the ammonia is reduced from about 95° F. to about 20° F. The ammonia which vaporizes from this pressure reduction passes from separator 38 through pipe 37 into the absorbing heat exchanger 61. The absorbent for absorbing these ammonia vapors enters pipe 37 through pipe 35 from a source to be described subsequently. Aqua ammonia bottoms from fractionator 11 not required in the reboiling operation are passed from pipe 13 to pipe 23 and are heated in heater 24 or are passed through by-pass line 63 around the heater into the flash tank 26. This liquid on passing through the valve which is operating in conjunction with the liquid level controller 25 permits a reduction of pressure of the aqua ammonia bottoms from about 155 p. s. i. a. to about 50 p. s. i. a., this latter pressure being controlled substantially by the rate of flow controller 20A which is disposed in pipe 28. The vaporous material which flash vaporizer in tank 26 contains about 51 weight percent ammonia (the remainder being water vapor) and this vaporous ammonia and water vapor passes on through pipe 27 provided with the air-fin cooler 59 and thence is added to the vaporous ammonia in pipe 37. The aforementioned aqua ammonia (pipe 35) is added to the contents of pipe 37 at substantially its point of attachment to the absorbing heat exchanger 61. The aqua ammonia from pipe 35 absorbs a large portion of the vaporous ammonia in pipe 37 prior to entry into the absorber 61. The aqua ammonia and any unabsorbed vaporous ammonia from pipe 37 pass into the absorbing exchanger 61 in which substantially all the vaporous ammonia becomes absorbed. Because vaporous ammonia is very rapidly soluble in water, this absorption takes place quite rapidly and in fact a large proportion of the vaporous ammonia is actually absorbed by the aqua ammonia by the time the aqua ammonia actually enters heat exchanger 61. As is well known, absorption of vaporous ammonia in water is exothermic and the plant cooling water flowing through the tubes in exchanger 61 cools the liquid and vaporous contents of the exchanger so as to promote substantially complete absorption of the ammonia in the aqua ammonia. The thus enriched aqua ammonia is passed from exchanger 61 through pipe 56 into separator 54 in which any unabsorbed gases, mostly inerts, are separated from the enriched aqua ammonia. This aqua ammonia contains approximately 49½ weight percent ammonia and is passed through pipe 22 by pump 55 and heater 60 into the fractionator 11 for recovery of the ammonia as substantially anhydrous ammonia.

A portion of the liquid ammonia from surge tank 38 passes through pipe 41, as a coolant through absorber-exchanger 30, and pipe 40 back into tank 38. Another portion is withdrawn from pipe 41 through pipe 42 and is passed into the surge tank 77. Just prior to entering surge tank 77, the pressure of this liquid ammonia is reduced from about 49 p. s. i. a. to about 20 p. s. i. a. by the valve which is operated in conjunction with the liquid level controller assembly 43. This assembly operates to maintain a constant level of liquid ammonia in this surge tank. Upon reduction in pressure from about 49 p. s. i. a. to 20 p. s. i. a., the temperature of the liquid is reduced from about +20° F. to about −16° F. due to evaporation of ammonia, and the cooled liquid ammonia at this latter temperature provides refrigeration for any desired plant operation. The evaporator 46 which is attached to surge tank 77 by pipes 44 and 47 is a vessel in which heat exchange tubes are placed for providing such refrigeration. Vapors produced in such a heat exchange operation as in vessel 46 are returned through pipe 47 to the surge tank 77. A portion of the liquid ammonia passing through pipe 44 at 20 p. s. i. a. is passed through pipe 45 into surge tank 51. A constant level of liquid ammonia is maintained in surge tank 51 by operation of the liquid level controller assembly 52 and on passing through the valve of this liquid level controller assembly pressure is reduced from 20 p. s. i. a. to about 2½ p. s. i. a. This pressure reduction drops the temperature of the liquid ammonia from −16° F. to about −80° F. due to ammonia flash evaporation. This liquid ammonia at this very low temperature is available to provide extremely low temperature refrigeration for any desired plant process. An evaporator vessel 48 similar to vessel 46 is provided with heat exchange tubes, for utilizing refrigeration at this −80° F. temperature. Vapors produced in this heat exchange are passed from evaporator 48 through pipe 49, surge tank 51 and thence through pipe 29 into the absorbing heat exchanger 30. The absorbent for recovering these latter mentioned ammonia vapors is the relatively dilute aqua ammonia produced in the flashing operation in flash vessel 26. These low content ammonia flash bottoms are passed through pipe 28 and are cooled in heat exchanger 60 prior to introduction into pipe 29.

Apparatus 20A is a rate of flow controller for maintaining a constant and uniform flow of flash bottoms into the absorber 30. These dilute flash bottoms contain about 7 weight percent ammonia and this relatively dilute aqua ammonia absorbs vaporous ammonia from pipe 29 on passage through the absorbing heat exchanger 30. This absorbing heat exchanger 30 is maintained at a relatively low absorption temperature by heat exchange with the liquid ammonia from surge tank 38. Aqua ammonia carrying in suspension any undissolved gases passes through pipe 71 into separator tank 72 in which these vapors are separated and are passed through pipe 73, under vacuum from a vacuum pump 64 in order to maintain a pressure of about 3 p. s. i. a. in this separator. The aqua ammonia separated in this separator 72 contains about 27½ weight percent ammonia and this liquid is passed through pipe 76, pump 75 and pipe 26 and is introduced into pipe 78 carrying vaporous ammonia enroute from surge tank 77 to separator 31. This 27½ percent ammonia solution has a temperature of about 25° F. and in pipe 78 it absorbs substantially all of the vaporous ammonia flowing in pipe 78. Upon dissolving this vaporous ammonia the aqueous ammonia increases in temperature from about 25° F. to about 70° F. at 20 p. s. i. a. The ammonia concentration of the aqueous ammonia in separator 31 is about 37 weight percent and it is this aqua ammonia solution which is passed through pipe 35 and is the absorbent for the water-ammonia vapors flowing through pipe 27 from the flash separator 26 into the absorber 61.

Vapors not absorbed by the aqua ammonia in absorber 61, as mentioned, are separated in separator 54 and these gases are passed through pipe 29A and are combined with the ammonia vapors flowing through pipe 78 for absorption in the aqua ammonia from pipe 26.

The vapors not absorbed by this 27½ percent aqua ammonia in pipe 78 are separated in separator 31 and are passed through pipe 32 and are ultimately added to the ammonia vapors flowing through pipe 29.

Summarizing these absorption steps, the dilute aqua ammonia from the bottom of the flash separator 26 absorbs ammonia vapors in absorber-exchanger 30 at a relatively low pressure to produce an aqua ammonia of intermediate concentration. This latter aqua ammonia then absorbs further vaporous ammonia in pipe 78 to produce aqua ammonia of 37 percent concentration which is passed on into the final high pressure absorber-exchanger 61 in which the concentration of ammonia is increased from about 37 percent to about 49½ percent by weight and it is this latter aqua ammonia which is passed to regenerator 11 for recovery of anhydrous ammonia. In this process, the aqua ammonia of lowest concentration is used to absorb vaporous ammonia at the lowest pressure and the aqua ammonia of highest concentration is used to absorb the ammonia vapors at the highest pressure, thus expediting ammonia recovery.

In the following tabulation is given in summary form the operating conditions of temperature and pressure and concentrations of ammonia in various streams of aqueous ammonia at various points in the process.

| Stream or Vessel No. | Composition | Pressure, p. s. i. a. | Temp., °F. |
| --- | --- | --- | --- |
| 15 | Heating steam at 15 p. s. i. g. | | |
| 22 | (Aqueous) Aq.—NH₃ 49.5 wt. percent NH₃ | | |
| 17, 19, 21 | Liq. NH₃, 99.5 wt. percent NH₃ | 153 | 95 |
| 23 | Aq. NH₃ 25 wt. percent NH₃ | | |
| 13 | Aq. NH₃ 25 wt. percent NH₃ | 155 | 240 |
| 26 | Aq. NH₃, NH₃—H₂O vapors (51 wt. percent NH₃) | 50 | 240 |
| 27 | NH₃—H₂O vapors, 51 wt. percent NH₃ | 50 | |
| 28 | Aq. NH₃ 7 wt. percent NH₃ | | |
| 29 | NH₃ vapors | 2.5 | −80 |
| 72 | Aq. NH₃, and vapors | 3 | 25 |
| 76 | Aq. NH₃, 27.5 wt. percent NH₃ | | |
| 77, 46 | Liquid NH₃ and vapors | 20 | −16 |
| 29A | NH₃ vapors | | |
| 31 | Aq. NH₃ and vapors | 20 | 75 |
| 32 | Aq. NH₃ vapors | | |
| 35 | Aq. NH₃, 37 wt. percent NH₃ | | |
| 37 | NH₃ vapors | 49 | 20 |
| 38 | NH₃ liquid and vapors | 49 | 20 |
| 42 (before expansion) | NH₃ liquid | 49 | 20 |
| 48, 51 | NH₃ liquid and vapor | 2.5 | −80 |
| 54 | Aq. NH₃ and vapor | 49 | 95 |
| 57 | Plant cooling water | | 90 |

The heat exchanging absorber which I prefer to use is that exemplified specifically in Figure 2. Such an absorber, when operated as absorber 61 of Figure 1, is preferably operated with its longitudinal axis disposed vertically and with plant cooling water entering the absorber through inlet 57 at the bottom and leaving the absorber through outlet 58 at the top. This water on flowing upward through this vessel flows through the heat exchange tubes 86. In order to obtain equal distribution of water through the several tubes 86, section 84 is substantially a header section and the outlet end of this exchanger is also provided with a header section 83. These header sections also serve as reducers so that the exchanger can be bolted to one end thereof and a pipe for transfer of the water bolted to the other ends. The aqua ammonia and vaporous ammonia for absorption enters the upper portion of this exchanger through an inlet pipe connection 37A and leaves the vessel through a lower outlet connection 56A. The aqua ammonia and vaporous ammonia fill the major portion of this exchanger between the pipes. I have provided contact promoting means within this exchanger to make certain of efficient contacting for substantially complete absorption of the vaporous ammonia by providing trays 87.

These trays contain openings 90 through each of which is disposed one of the water carrying pipes 86. The diameters of these openings are somewhat greater than the outer diameter of pipes 86 so that liquid on the trays flows downward from tray to tray in direct contact with the pipes. The diameters of these openings 90 are so designed with respect to the outer diameters of tubes 86 that there is always liquid held on the trays. These trays have upturned outer edges about 2 inches high so as to maintain about 2 inches head of liquid on each of the trays. The trays also are made of a slightly smaller diameter than the inner diameter of the vessel 61 in order to maintain a free cross sectional area through which unabsorbed gases may flow freely with a minimum pressure drop from tray to tray. Any unabsorbed gases are ultimately entrained in the aqua ammonia and leave this absorber through outlet 56A.

Figure 3 is a cross-sectional view on an enlarged scale taken on the line 3—3 of Figure 2 and shows the annular space 89 between the outer edge of trays 87 and the wall of the vessel and also the annular spaces 90 between the tray and tubes 86 for downflow of aqua ammonia. The bottom of the trays is identified by reference numeral 77 and the upturned edge by reference numeral 91. Tubes 86 extend through an upper header plate 88 and through a similar lower header plate, not shown.

While I have described the use of such absorbing heat exchangers as that illustrated in Figures 1 and 2 in my absorption refrigeration process, it is obvious that absorbing heat exchangers of other types can be used such as horizontally disposed heat exchangers. I find, however, that absorbing heat exchangers as illustrated in Figures 1 and 2 work very efficiently for absorption of vaporous ammonia in aqua ammonia as herein disclosed.

The trays are disposed about six inches apart, that is, from the bottom of one tray to the top edge of the next lower tray is about six inches and the rims 91 at the edge of the trays are about two inches high so as to maintain a depth of liquid of about two inches on each tray.

In Figure 1 absorbing heat exchanger 30 is indicated as similar to exchanger 61. While exchanger 61 is described as utilizing water as a coolant, any other suitable coolant can be used, such as liquid ammonia in the absorbing exchanger 30. In exchanger 30 operating with liquid ammonia, the liquid ammonia enters the exchanger at the bottom and leaves at the top, as at 58A, so that vapors formed therein can be easily removed.

Such an absorption refrigeration system as herein disclosed finds use in such commercial operations as, for example, in the separation of ethylene from mixtures with ethane and other low boiling gases.

It is obvious that depending upon the particular temperature requirements of any given commercial operation the particular pressures maintained in the several evaporators, as evaporators 46 and 48, will be different as is well understood by those skilled in the art. For example if refrigeration at −50° F. were required instead of −80° F. the valve in pipe 45 would lower the pressure of the liquid ammonia from 20 p. s. i. a. to a pressure higher than 2½ p. s. i. a., for example about 8 or 9 pounds p. s. i.a.

Under some conditions it may be desirable to employ a third absorbing heat exchanger arranged to promote absorption of ammonia vapors herein described as flowing through pipe 78 in the aqua ammonia from pipe 26. That is, for example, if the refrigeration load required of evaporator 46 were very heavy, very large quantities of ammonia vapors would be produced therein and residence time or considerable cooling would be required to absorb these large volumes of ammonia in this 27½ percent aqua ammonia. However, without excessive refrigeration requirements in evaporator 46, I find that because ammonia dissolves quite rapidly in aqua ammonia a third absorbing heat exchanger is ordinarily not required.

Under some conditions it may be desirable to provide an indirect heat exchanger 60A in order to heat exchange the flash tank vapors passing through pipe 27 with the aqua ammonia feed passing through conduit 22 at a point between heat exchanger 60 and the fractionator 11. When such an indirect heat exchanger is provided the air-fin cooler 59 may or may not be required.

In applying my refrigeration system to an ethylene separation plant in which ethylene is separated and recovered from a mixture containing hydrogen, methane, ethane, ethylene, propane, propylene and other hydrocarbons boiling higher than propane, I have illustrated in Figure 1 several locations to which member parts of an ethylene plant are attached to utilize the available refrigeration, and furthermore to utilize as efficiently as possible normally available plant cooling water.

At the ammonia condenser 16, plant cooling water from a source, not shown, is introduced into the condenser via a pipe 107, and if desired effluent water can be withdrawn through a pipe 108 for such disposal as desired, or preferably it is passed through a pipe 109 containing a valve 109A, thence through a pipe 124 to an exchanger 123 for cooling aqua ammonia from pipe 26 while absorbing ammonia from pipes 78 and 78A (with valve 121 being closed) in a conduit 122. From exchanger 123 effluent water is passed through pipes 124A, 129 and 57 into the absorber-exchanger 61, and out through pipe 58. Plant cooling water can, under some conditions, be passed through the exchanger 123 (in via pipes 130 and 124 and out via pipes 124A and 131), through the exchanger-absorber 61 (in via pipes 130A and 57 and out via pipe 58) and through the condenser 16 in parallel, each taking plant water at 85° to 90° F., and discharging the water at somewhat higher temperatures. However, I prefer to pass the plant cooling water through the condenser 16, the exchanger 123 and the absorber-exchanger 61 in series. In this latter case, when plant water from a cooling tower enters condenser 16 at about 86° F., it is progressively heated by condenser 16, exchanger 123 and the absorber-exchanger 61 to a temperature of about 103° F. However, the exact temperature of exit of the water will depend upon the rate of water flow and the cooling load. The temperatures 86° F. and 103° F. are given merely as an illustration of operable temperatures.

In the evaporator 46 is disposed a heat exchanger 143. Pipes 141 and 142, respectively, conduct material to be cooled by liquid ammonia to and from this exchanger. In an ethylene plant pipes 141 and 142 provide refrigeration for refluxing a deoiler column which removes $C_4$'s and higher boiling hydrocarbons from $C_3$'s and lower boiling hydrocarbons and hydrogen, if present.

A heat exchanger 151 is disposed in the evaporator 48 for making available −80° F. refrigeration. Pipes 152 and 153 conduct material to be chilled to and from, respectively, this exchanger. This degree of refrigeration is used in refluxing a demethanizing absorber employed in demethanizing the overhead product of the above mentioned deoiler column containing $C_3$ and $C_2$ hydrocarbons, methane, and hydrogen if present.

In such an ethylene separation system, there is produced an intermediate product containing the $C_2$ hydrocarbons, i. e. the ethane and the ethylene. These latter hydrocarbons are separated from one another in a fractional distillation column, frequently called an ethane-ethylene splitter. An advantageous mode of operating such a column is to supply reboiling heat therefor from the absorber-exchanger 30. Kettle product from the splitter column, not shown, is passed through a pipe 161 containing a valve 162, with valve 163 in pipe 41 being closed, through the tubes in the absorber-exchanger 30 and is heated therein. The heated kettle material is withdrawn from the absorber-exchanger through a pipe 164, with the valve in pipe 40 being closed. This withdrawn heated material is then passed to the reboiler of the splitter column for imparting reboiling heat thereto.

Regenerator column 11 can, under some conditions, be operated at a higher kettle temperature and pressure than hereinbefore disclosed to furnish heat for reboiling the aforementioned demethanizer-absorber. Heat is furnished for reboiling the aforementioned demethanizer-absorber by passing the hot weak aqua ammonia from the kettle of the column 11 through pipes 13, 23, exchanger 24, and pipes 63 and 101 with the appropriate valves including valve 105 being open and valves 102 and 101A being closed. Valve 106 also is closed. A stream of demethanizer-absorber kettle product is passed through a pipe 104, exchanger 24 and through a pipe 103 for return to the demethanizer-absorber kettle to deliver its heat. In this manner exchanger 24 serves to heat the demethanizer-absorber kettle material and as a cooler for the weak aqua ammonia from the fractionator 11.

Additional reboiling heat for the demethanizer-absorber column is sometimes required and such additional heat is provided by a heat exchanger 126 in a line 125 through which aqua ammonia is passing from pipe 35 and separator 31. When this additional reboiling heat is required a portion of the kettle contents of the demethanizer-absorber column is passed via a pipe 128 to exchanger 126 and thence returned to the reboiler via a pipe 127. While kettle product from the reboiler of the demethanizer-absorber can be passed through the exchanger 24 and the exchanger 126 in series, it is preferable to pass separate streams of the kettle material through these exchangers, i. e. in parallel. When exchanger 126 is in service the valve in pipe 35 is closed and the valves in conduit 125 are open, and when this exchanger is not in service, the valves in pipe 125 are closed and the valve in pipe 35 is open.

When the distillation column 11 is operated at a higher pressure and higher kettle temperature than hereinbefore disclosed, the exchanger 24 is operated as a cooler, as mentioned, and the flash tank 26 is bypassed, the concentration of ammonia in the aqua ammonia in pipe 28 is not much different than when the still is operated with exhaust steam and the exchanger 24 is a heater and the flash tank is used. The operation of subsequent steps is not altered appreciably.

While certain embodiments of the invention have been described for illustrative purposes, the invention obviously is not limited thereto.

I claim:

1. A method for providing refrigeration which comprises flashing liquid ammonia in successively lower pressure flashing steps to cool the unvaporized ammonia to desired refrigeration temperatures, absorbing the flashed ammonia in aqueous ammonia of progressively increased concentrations of ammonia in progressively higher temperature and pressure absorption steps, passing the finally produced aqueous ammonia into a fractionation column and therein fractionating said aqueous ammonia under superatmospheric pressure to produce an overhead vaporous ammonia product and a bottoms product of aqueous ammonia more dilute than the aqueous ammonia passed into the column as feed, condensing said overhead vaporous ammonia to produce liquid ammonia, reducing the pressure on the aqueous ammonia bottoms product in a bottoms flashing operation, removing flash vapors of aqueous ammonia from this bottoms flashing operation and passing same into the absorption step of highest pressure and temperature of the successive absorption steps, cooling the flash bottoms of said bottoms flashing operation in indirect heat exchange with the aqueous ammonia feed to said column, passing the cooled flash bottoms of said bottoms flashing operation into the absorption step of lowest pressure and temperature of the successive absorption steps, cooling the aqueous ammonia and vaporous ammonia of the highest pressure absorption step by indirect heat exchange with plant cooling water and cooling the aqueous ammonia and vaporous ammonia of the lowest pressure absorption step by indirect heat exchange with the condensed liquid ammonia.

2. A method for providing refrigeration which comprises flashing lquid ammonia in successively lower pressure flashing steps to cool the unvaporized ammonia to desired refrigeration temperatures, absorbing the flashed ammonia in aqueous ammonia of progressively increased concentrations of ammonia in progressively higher pressure absorption steps, passing the finally produced aqueous ammonia into a fractionation column and therein fractionating said aqueous ammonia under superatmospheric pressure to produce an overhead vaporous ammonia product and a bottoms product of aqueous ammonia more dilute than the aqueous ammonia passed into the column feed, condensing said overhead vaporous ammonia to produce liquid ammonia, reducing the pressure on the aqueous ammonia bottoms product in a bottoms flashing operation, removing flash vapors of aqueous ammonia from this bottoms flashing operation and passing same into the absorption step of highest pressure of the successive absorption steps, passing the flash bottoms of said bottoms flashing operation into the absorption step of lowest pressure of the successive absorption steps, cooling the aqueous ammonia and vaporous ammonia of the highest pressure absorption step by indirect heat exchange with plant cooling water and cooling the aqueous ammonia and vaporous ammonia of the lowest pressure absorption step by indirect heat exchange with the condensed liquid ammonia.

3. In the method of claim 2 carrying out the fractionating operation by heating the kettle of the fractionator indirectly with normally waste plant steam.

4. A method for providing refrigeration comprising cooling liquid ammonia by reducing the pressure thereon from a superatmospheric pressure in a first flash vaporizing step, thereby producing first ammonia flash vapors and a first cooled liquid ammonia, absorbing the first ammonia flash vapors and in ammonia-water vaporous stream as subsequently produced in an aqueous ammonia of intermediate ammonia concentration as subsequently produced in an indirect heat exchange operation with plant cooling water to produce a concentrated aqueous ammonia, distilling said concentrated aqueous ammonia to produce an overhead vaporous ammonia product and a dilute liquid aqueous ammonia bottoms product, condensing said overhead vaporous ammonia to produce the first mentioned liquid ammonia, reducing the pressure of said aqueous ammonia bottoms product in a second flashing operation thereby producing said ammonia-water vaporous stream as subsequently produced and a second liquid aqueous ammonia flash bottoms of lower ammonia concentration than said dilute aqueous ammonia bottoms product, reducing the pressure on said first cooled liquid ammonia in a third flash vaporizing step thereby producing second ammonia flash vapors and second cooled liquid ammonia at a first desired refrigeration temperature, absorbing said second ammonia flash vapors in an aqueous ammonia of concentration lower than said intermediate ammonia concentration as subsequently produced at the pressure of said third flash vaporizing step to produce said aqueous ammonia of intermediate ammonia concentration as subsequently produced, reducing the pressure on the cooled liquid ammonia at said first desired refrigeration in a fourth flash vaporizing step thereby producing third ammonia flash vapors and a third cooled liquid ammonia at a second desired refrigeration temperature lower than said first desired refrigeration temperature, absorbing said third ammonia flash vapors in said second liquid aqueous ammonia flash bottoms in an indirect heat exchange operation with said first cooled liquid ammonia to produce said aqueous ammonia of concentration lower than said intermediate ammonia concentration as subsequently produced.

5. In the method of claim 4 wherein the heat for reboiling the fractionation operation is about 15 pound pressure steam the fractionator pressure is about 155 p. s. i. a. and the kettle temperature is about 240° F.

6. In the method of claim 4 wherein the pressure of the second flashing operation is about 50 p. s. i. a.

7. In the method of claim 4 wherein the pressure of the first, third and fourth flashing steps are about 49 p. s. i. a., 20 p. s. i. a. and 2.5 p. s. i. a., respectively.

8. In the method of claim 1, condensing said overhead vaporous ammonia to produce liquid ammonia by indirect heat exchange with plant water, passing the plant water from the overhead ammonia condensing step serially in indirect heat exchange with vaporous ammonia undergoing absorption in aqua ammonia in two progressively higher temperature and higher pressure absorption steps.

9. In the method of claim 1, cooling said bottoms product of aqua ammonia by indirect heat exchange with the kettle product of a demethanizer-absorber producing an overhead product comprising methane and a kettle product comprising ethane, ethylene, propane and propylene from a feed stock comprising said methane, ethane, ethylene, propane and propylene, thereby providing reboiling heat to the kettle of said demethanizer-absorber.

10. In the method of claim 1 indirect heat exchanging the flashing liquid ammonia of the lowest pressure liquid ammonia flashing step of the successively lower pressure liquid ammonia flashing steps, with the contents of the upper portion of a demethanizer-absorber operating to produce an overhead product comprising methane and a kettle product comprising ethane, ethylene, propane, propylene from a feed stock comprising said hydrocarbons, thereby providing reflux for said demethanizer-absorber.

11. In the method of claim 1, cooling the flashed ammonia vapors undergoing absorption in the aqueous ammonia of the lowest ammonia concentration of the aqueous ammonia solutions of progressively increased concentrations of ammonia in indirect heat exchange with the kettle product of an ethane-ethylene fractionating column operating to produce an overhead product comprising ethylene and a kettle product comprising ethane from a feed stock comprising these two hydrocarbons, thereby providing reboiling heat to the kettle of said ethane-ethylene fractionating column.

12. In the method of claim 1 cooling the aqua ammonia solution of the next lowest concentration of ammonia of the aqua ammonia solutions of progressively increased concentrations of ammonia by indirect heat exchange with the kettle product of a demethanizer-absorber producing an overhead product comprising methane and a kettle product comprising ethane, ethylene, propane and propylene from a feed stock comprising said methane, ethane, ethylene, propane and propylene, thereby providing reboiling heat to the kettle of said demethanizer-absorber.

13. A method for providing refrigeration comprising cooling liquid ammonia by reducing the pressure thereon from a superatmospheric pressure in a first flash vaporizing step, thereby producing first ammonia flash vapors and a first cooled liquid ammonia, absorbing the first ammonia flash vapors and an ammonia-water vaporous stream as subsequently produced in an aqueous ammonia of intermediate ammonia concentration as subsequently produced in an indirect heat exchange operation with plant cooling water to produce a concentrated aqueous ammonia, the absorbing operation comprising introducing said first ammonia flash vapors, said ammonia-water vaporous stream and said aqueous ammonia of intermediate concentration into the upper portion of an absorbing heat exchange zone, passing these introduced materials downward in said zone in indirect heat exchange with upflowing cooling medium thereby producing a cool concentrated aqueous ammonia, withdrawing this cool concentrated aqueous ammonia from the lower portion of said zone, distilling the withdrawn concentrated aqueous ammonia to produce an overhead vaporous ammonia product and a dilute liquid aqueous ammonia bottoms product, condensing said overhead vaporous ammonia to produce the first mentioned liquid ammonia, reducing the pressure of said aqueous ammonia bottoms product in a second flashing operation thereby producing said ammonia-water vaporous stream as subsequently produced and a second liquid aqueous ammonia flash bottoms of lower ammonia concentration than said dilute aqueous ammonia bottoms product, reducing the pressure on said first cooled liquid ammonia in a third flash vaporizing step thereby producing second ammonia flash vapors and second cooled liquid ammonia at a first desired refrigeration temperature, absorbing said second ammonia flash vapors in an aqueous ammonia of concentration lower than said intermediate ammonia concentration as subsequently produced at the pressure of said third flash vaporizing step to produce said aqueous ammonia of intermediate ammonia concentration as subsequently produced, reducing the pressure on the cooled liquid ammonia at said first desired refrigeration in a fourth flash vaporizing step thereby producing third ammonia flash vapors and a third cooled liquid ammonia at a second desired refrigeration temperature lower than said first desired refrigeration temperature, absorbing said third ammonia flash vapors in said second liquid aqueous ammonia flash bottoms in an indirect heat exchange operation with said first cooled liquid ammonia to produce said aqueous ammonia of concentration lower than said intermediate ammonia concentration as subsequently produced.

14. In the method of claim 4 wherein said first and second desired refrigeration temperatures are about −16° F. and −80° F., respectively.

References Cited in the file of this patent

UNITED STATES PATENTS

| | | |
|---|---|---|
| 1,425,019 | Jordan | Aug. 8, 1922 |
| 2,103,596 | Raigorodsky | Dec. 28, 1937 |
| 2,216,175 | Helbing | Oct. 1, 1940 |
| 2,248,178 | Kuenzli | July 8, 1941 |
| 2,253,892 | Clayton | Aug. 26, 1941 |
| 2,336,097 | Hutchinson | Dec. 7, 1943 |
| 2,392,894 | Zwickl | Jan. 15, 1946 |
| 2,519,618 | Wilson | Aug. 22, 1950 |
| 2,548,508 | Wolfner | Apr. 10, 1951 |
| 2,610,038 | Phillips | Sept. 9, 1952 |

FOREIGN PATENTS

| | | |
|---|---|---|
| 553,485 | Great Britain | May 24, 1943 |